United States Patent [19]
Tsunekawa

[11] Patent Number: 6,095,447
[45] Date of Patent: Aug. 1, 2000

[54] RECORDING AND/OR REPRODUCING APPARATUS PROVIDED WITH REEL MOUNT DEVICE FOR MOUNTING TAPE REEL THEREON

[75] Inventor: Michihiko Tsunekawa, Kawasaki, Japan

[73] Assignee: Canon Kabushiki Kaisha, Tokyo, Japan

[21] Appl. No.: 09/129,573

[22] Filed: Aug. 5, 1998

[30] Foreign Application Priority Data

Aug. 25, 1997 [JP] Japan .................................. 9-228049

[51] Int. Cl.[7] .................................................. G03B 23/02
[52] U.S. Cl. .......................................... 242/343.1; 360/95
[58] Field of Search ................................ 242/343, 343.1, 242/338.1, 338.3; 360/95

[56] References Cited

U.S. PATENT DOCUMENTS

| | | | |
|---|---|---|---|
| 5,486,958 | 1/1996 | Choi et al. .............................. | 360/95 X |
| 5,547,142 | 8/1996 | Cheatham et al. .................. | 242/343 X |
| 5,691,858 | 11/1997 | Lee et al. .............................. | 360/95 X |

*Primary Examiner*—Donald P. Walsh
*Assistant Examiner*—William A. Rivera
*Attorney, Agent, or Firm*—Robin, Blecker & Daley

[57] ABSTRACT

A reel mount device includes a pair of reel mounts on which to place a pair of reels, respectively, gears respectively provided at the pair of reel mounts, each of the gears having a plurality of teeth and externally receiving a driving force for rotating the corresponding reel mount, a first brake member having a shoe which is formed with plastic and is arranged to come into contact with tips of the plurality of teeth of the gear provided at one of the pair of reel mounts, and an urging member which urges the shoe of the first brake member in such a direction to come into pressure contact with the plurality of teeth.

12 Claims, 9 Drawing Sheets

RECORDING AND/OR REPRODUCING APPARATUS PROVIDED WITH REEL MOUNT DEVICE FOR MOUNTING TAPE REEL THEREON

BACKGROUND OF THE INVENTION

1. Field of the Invention

The present invention relates to a recording and/or reproducing apparatus such as a video cassette recorder (VCR) or the like, and more particularly to a reel brake device for a reel mount which causes a tape pulled out from a cassette to travel forward and backward.

2. Description of Related Art

Figure 8:
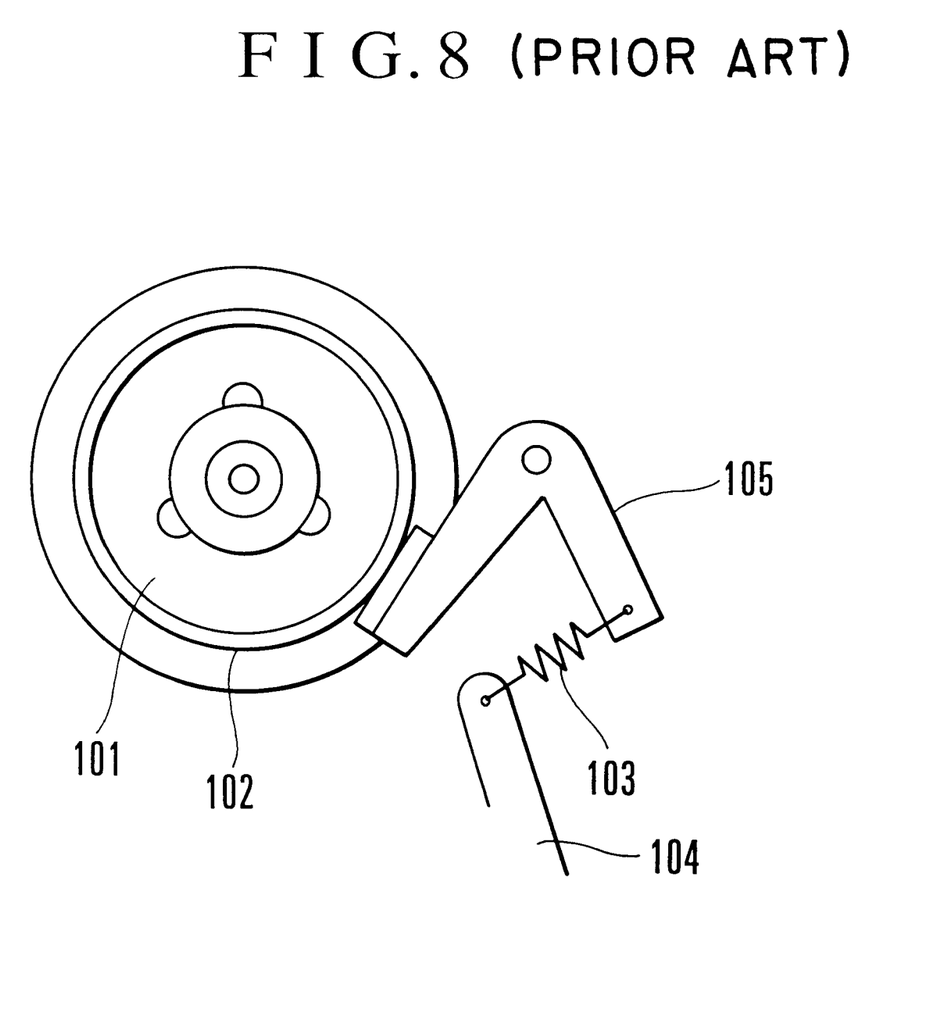
FIG. 8 is a plan view showing a conventional reel brake device.

In a conventional reel brake device, for example, as shown in FIG. 8, one end part of a brake lever 105 is connected to a driving mechanism 104 through a spring 103, and when the driving mechanism 104 is operated, the other end part of the brake lever 105 acts to apply or remove a pushing force to and from a brake pressure contact part 102 of the reel mount 101, so that a braking force onto the reel mount 101 is obtained. For this purpose, the brake pressure contact part 102 is provided on the outer circumferential side of a cylindrical part of the reel mount 101, as shown in FIGS. 9(A) and 9(B).

Figure 10:
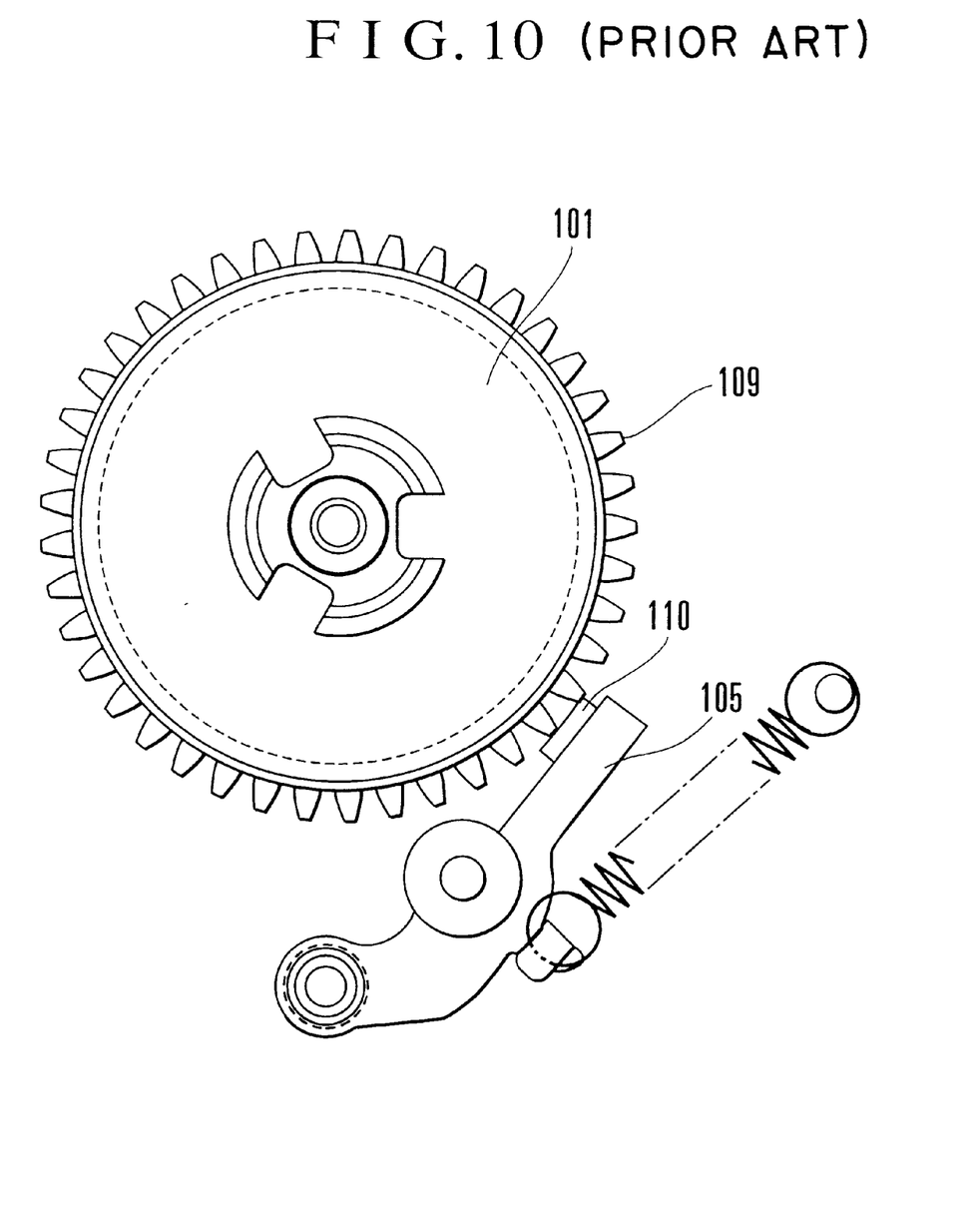
FIG. 10 is a plan view showing the details of a brake shoe part of another conventional reel brake device.

Meanwhile, a known reel brake mechanism which is different from but resembles a mechanism related to the invention is configured as shown in FIG. 10. According to the arrangement of the known mechanism, the gear-tooth tips 109 of a reel mount 101 are used as a brake pressure contact part, and a brake shoe part 110 is formed by mounting a piece of felt or synthetic leather on a brake lever 105. In applying the brake, the brake shoe part 110 is made to directly come into pressure contact with the gear-tooth tips 109.

Figure 9A:
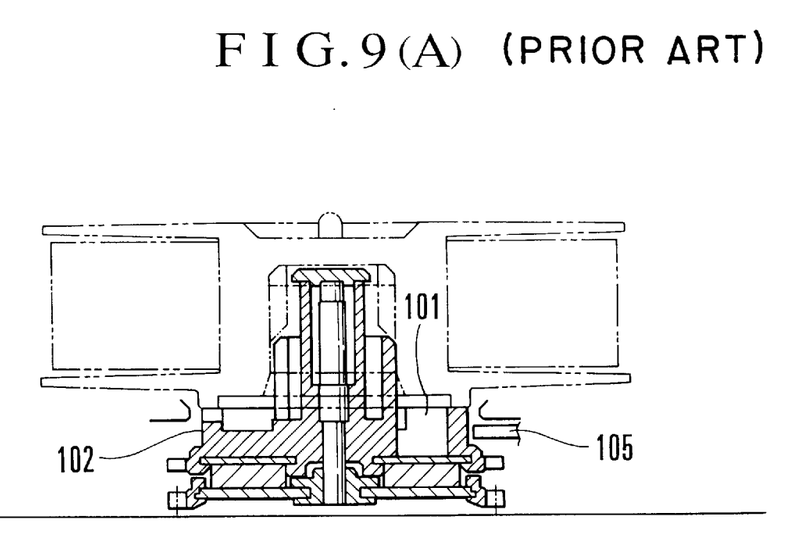
FIGS. 9(A) and 9(B) are side sectional views showing the convention reel brake device.
Figure 9B:
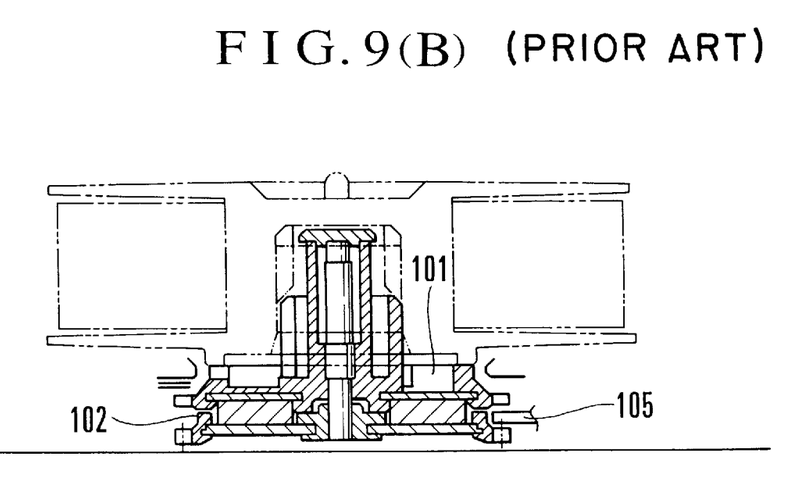

According to the conventional arrangement shown in FIGS. 8, 9(A) and 9(B), the brake pressure contact part 102 for receiving a braking force must be provided on the outer side of the cylindrical part of the reel mount 101. Therefore, the reel mount 101 itself inevitably becomes large in height.

Further, in the case of the arrangement shown in FIG. 10, a piece of felt or synthetic leather which is readily deformable is arranged to apply a stopping torque to the reel mount 101 for the purpose of functioning as a lock brake. This arrangement is, therefore, not expected to give a stable braking force with a constant torque.

BRIEF SUMMARY OF THE INVENTION

It is an object of the invention to provide a reel mount device which is compactly arranged to ensure an adequate operation without requiring a large space.

To attain the above object, in accordance with an aspect of the invention, there is provided a reel mount device, which comprises a pair of reel mounts on which to place a pair of reels, respectively, gears respectively provided at the pair of reel mounts, each of the gears having a plurality of teeth and externally receiving a driving force for rotating the corresponding reel mount, a first brake member having a shoe which is formed with plastic and is arranged to come into contact with tips of the plurality of teeth of the gear provided at one of the pair of reel mounts, and an urging member which urges the shoe of the first brake member in such a direction to come into pressure contact with the plurality of teeth.

In accordance with another aspect of the invention, there is provided a reel mount device, which comprises a pair of reel mounts on which to place a pair of reels, respectively, gears respectively provided at the pair of reel mounts, each of the gears having a plurality of teeth and externally receiving a driving force for rotating the corresponding reel mount, a first brake member having a shoe which is arranged to come into contact with tips of the plurality of teeth of the gear provided at one of the pair of reel mounts and a lock part which is arranged to engage a part between two teeth of the plurality of teeth of the gear when the shoe moves away from the tips of the plurality of teeth, and an urging member which urges the shoe of the first brake member in such a direction to come into pressure contact with the plurality of teeth.

In accordance with a further aspect of the invention, there is provided a recording and/or a reproducing apparatus, which comprises a rotary drum having a head, a cassette placing member capable of placing a cassette thereon and moving forward and backward with respect to the rotary drum, a reel mount device comprising a pair of reel mounts on which to place a pair of reels, respectively, gears respectively provided at the pair of reel mounts, each of the gears having a plurality of teeth and externally receiving a driving force for rotating the corresponding reel mount, a first brake member having a shoe which is formed with plastic and is arranged to come into contact with tips of the plurality of teeth of the gear provided at one of the pair of reel mounts, and an urging member which urges the shoe of the first brake member in such a direction to come into pressure contact with the plurality of teeth, and a pulling-out member arranged to pull a tape out from the cassette placed on the pair of reel mounts and to wrap the tape around the rotary drum.

In accordance with a still further aspect of the invention, there is provided a recording and/or a reproducing apparatus, which comprises a rotary drum having a head, a cassette placing member capable of placing a cassette thereon and moving forward and backward with respect to the rotary drum, a reel mount device comprising a pair of reel mounts on which to place a pair of reels, respectively, gears respectively provided at the pair of reel mounts, each of the gears having a plurality of teeth and externally receiving a driving force for rotating the corresponding reel mount, a first brake member having a shoe which is arranged to come into contact with tips of the plurality of teeth of the gear provided at one of the pair of reel mounts and a lock part which is arranged to engage a part between two teeth of the plurality of teeth of the gear when the shoe moves away from the tips of the plurality of teeth, and an urging member which urges the shoe of the first brake member in such a direction to come into pressure contact with the plurality of teeth, and a pulling-out member arranged to pull a tape out from the cassette placed on the pair of reel mounts and to wrap the tape around the rotary drum.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
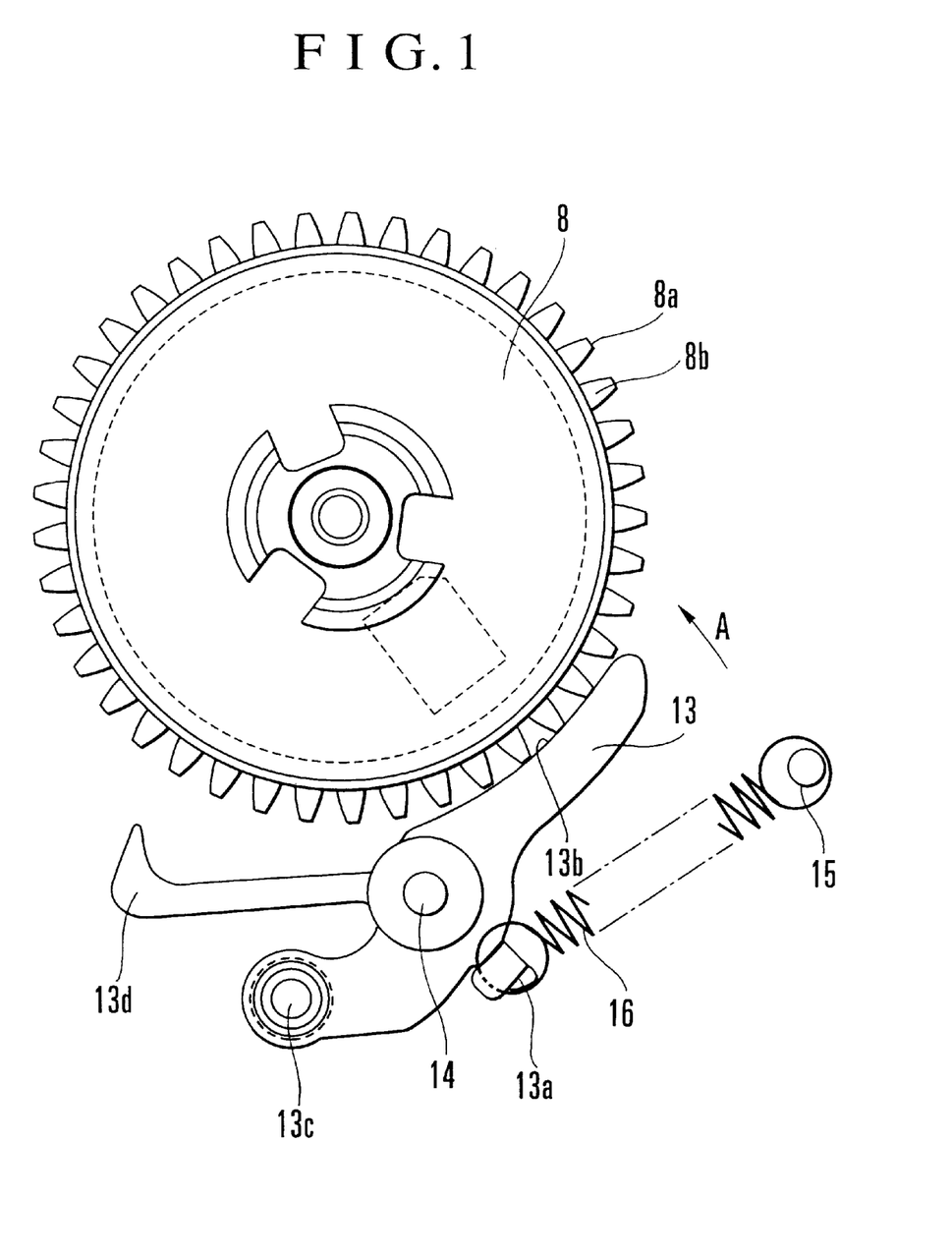
FIG. 1 is a plan view showing a reel mount device according to an embodiment of the invention, illustrating such a state that a reel mount is being braked during the loading of a tape.
Figure 2:
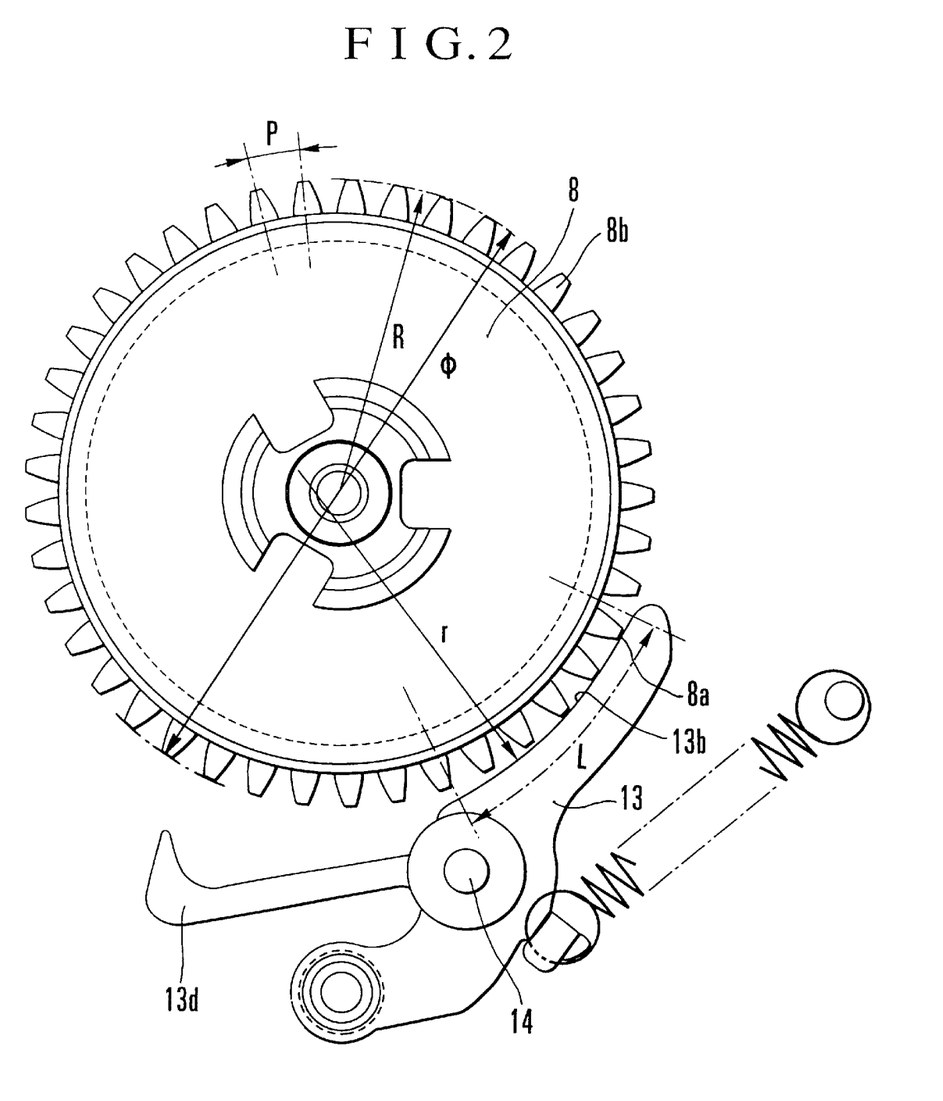
FIG. 2 is a plan view showing a part of the reel mount device shown in FIG. 1, illustrating the details of a brake shoe part.
Figure 3:
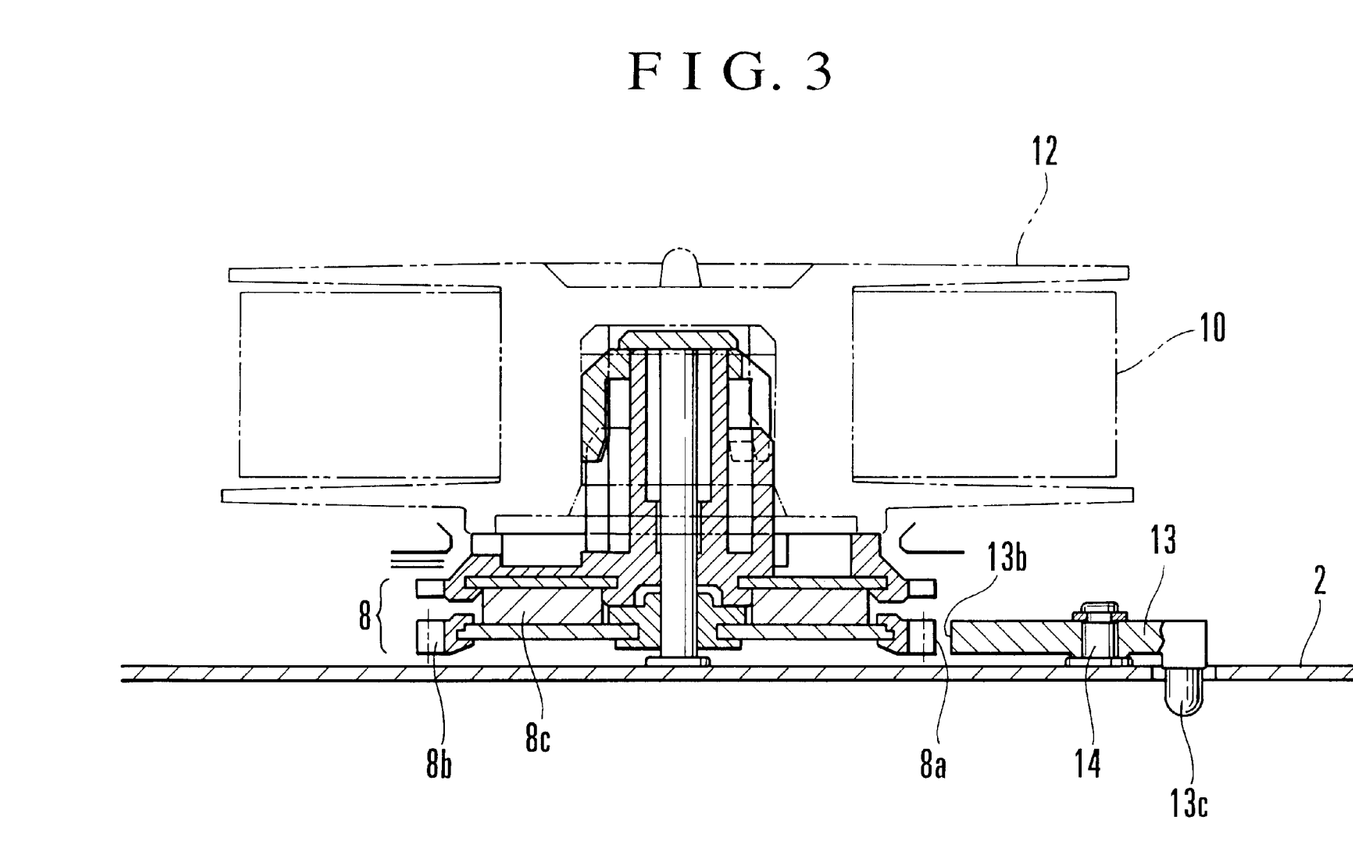
FIG. 3 is a side sectional view of the reel mount device according to the embodiment of the invention.
Figure 4:
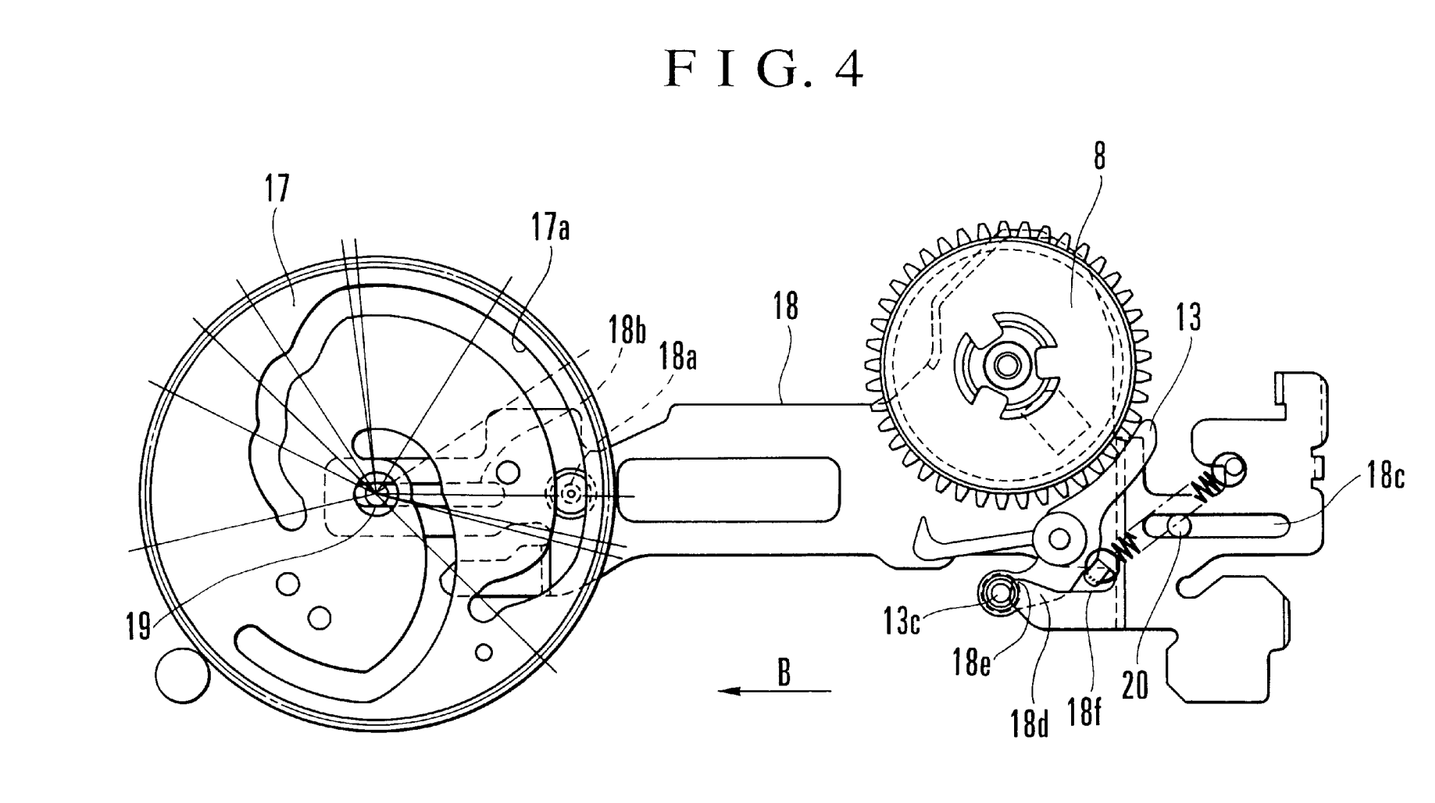
FIG. 4 is a plan view showing a mechanism part for operating a brake lever in the embodiment of the invention.
Figure 5A:
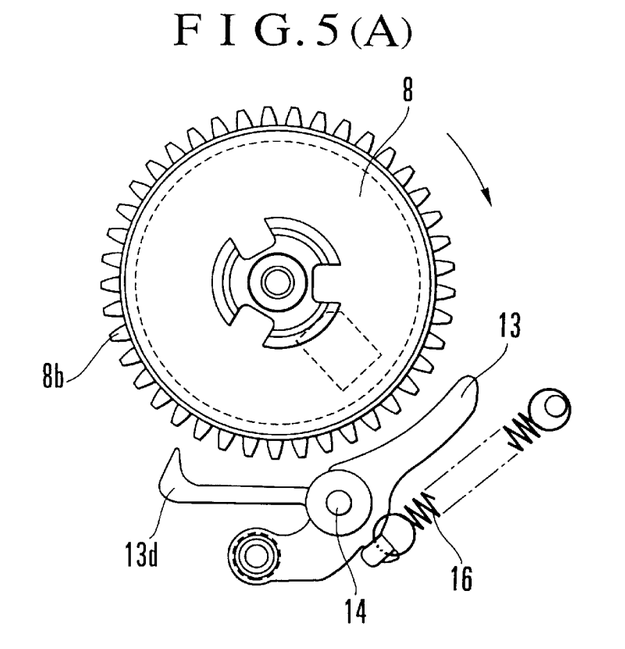
FIGS. 5(A) and 5(B) show the reel mount device, according to the embodiment of the invention, in the state in which the reel mount is being rotated in a normal direction without being braked and in the state in which the reel mount is being rotated in a reverse direction, respectively.
Figure 5B:
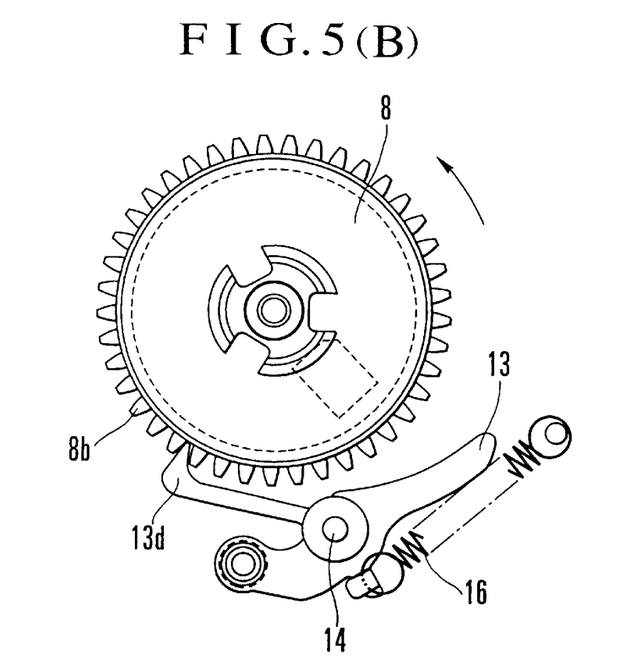

FIG. 1 to FIGS. 5(A) and 5(B) illustrate a reel mount device having a reel brake mechanism according to the embodiment of the invention. FIGS. 1 and 2 are plan views showing the reel mount device in the state in which the reel mount is being braked. FIG. 3 is a side sectional view of the reel mount device. FIG. 4 shows a mechanism part for operating the reel brake mechanism. FIGS. 5(A) and 5(B) respectively show the reel brake mechanism in different operation modes.

Prior to describing the reel brake mechanism, the whole arrangement of a VCR having the reel mount device according to the embodiment is first described below with reference to FIGS. 6 and 7.

Figure 6:
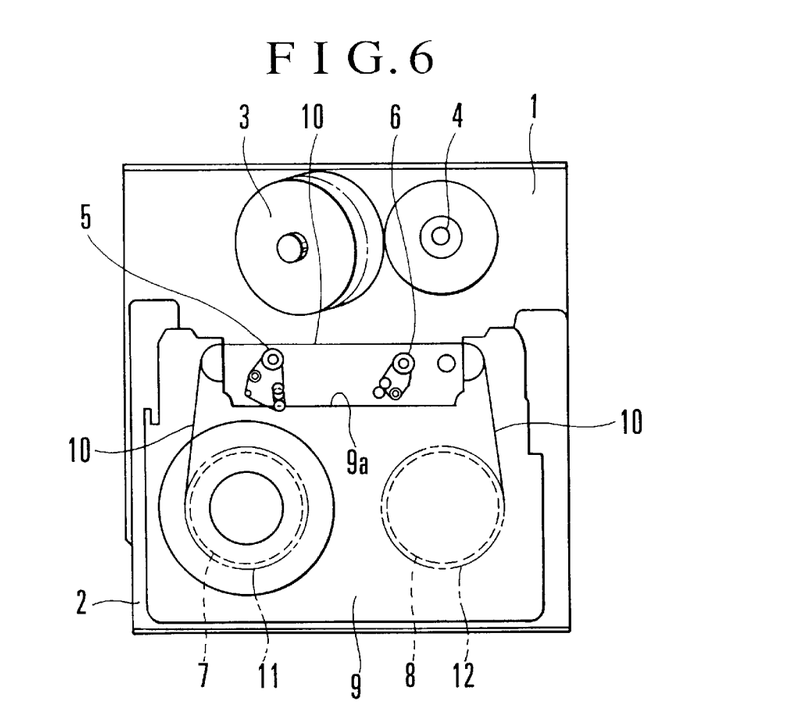
FIG. 6 is a plan view showing in outline the tape unloading state of a VCR (video cassette recorder) according to the embodiment of the invention.
Figure 7:
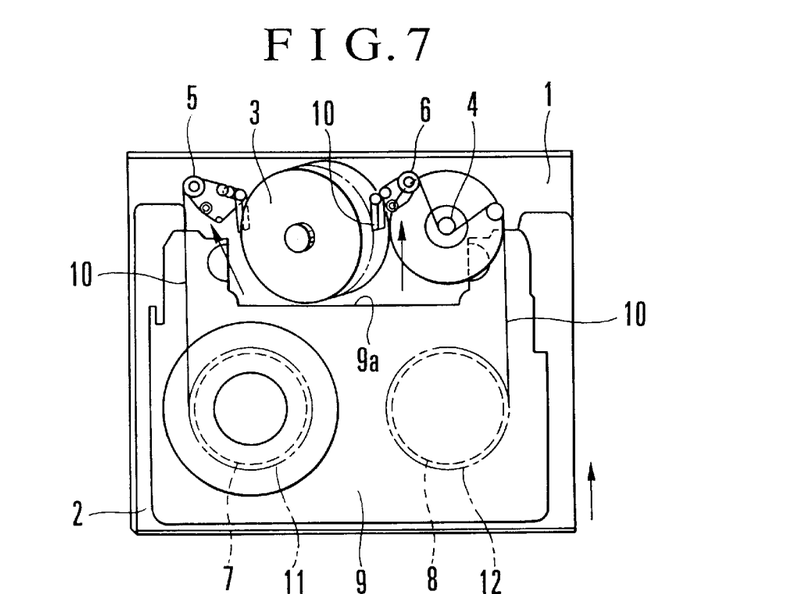
FIG. 7 is a plan view showing in outline the tape loading completion state of the VCR according to the embodiment of the invention.

Referring to FIGS. 6 and 7, reference numeral 1 denotes a main chassis and reference numeral 2 denotes a slide chassis (a cassette placing member). The slide chassis 2 is arranged to be slidable over the main chassis 1. A rotary drum 3 is disposed aslant on the main chassis 1. A capstan 4 is secured to the main chassis 1. Tape guide members 5 and 6 are arranged as tape loading means. A pair of reel mounts 7 and 8 are mounted on the slide chassis 2 and are disposed on a tape supply side and a tape take-up side, respectively. Reference numeral 9 denotes a cassette into which a pair of reels 11 and 12 on which a magnetic tape 10 is wound are accommodated.

Operation of the VCR is briefly described below. Referring to FIG. 6, the cassette 9 is first put on the slide chassis 2, and the reels 11 and 12 are fitted on the reel mounts 7 and 8. After that, the slide chassis 2 is caused to slide toward the rotary drum 3 relative to the main chassis 1, and, at the same time, the tape guide members 5 and 6 pull out the tape 10 from an opening part 9a of the cassette 9.

Eventually, at least a part of the rotary drum 3 relatively comes into the opening part 9a of the cassette 9, as shown in FIG. 7, and the tape 10 is loaded along a predetermined path including a helicoidal wrapping part around the circumferential surface of the rotary drum 3. Under this condition, a pinch roller (not shown) presses the tape 10 against the capstan 4, which causes the tape 10 to travel.

With the tape 10 thus caused to travel, information can be recorded or reproduced by a magnetic head of the rotary drum 3 as desired.

In this instance, according to the embodiment, during the process of transition from the state shown in FIG. 6 to the state shown in FIG. 7, that is, while the tape is in process of loading, the supply-side reel mount 7 is being locked, for example, by a mechanism (a brake member) which is not shown but is similar to a lock claw part 13d shown in FIG. 1. Therefore, the tape 10 is pulled out from the take-up-side reel mount 8 by the tape guide members 5 and 6. At this time, in order to stably pull out the tape 10, it is necessary to apply a stable back tension to the tape 10 by applying a stable braking force to the reel mount 8 with the reel brake mechanism.

Now, the reel brake mechanism disposed on the slide chassis 2 of the VCR is described in detail as follows.

Referring to FIG. 1, the take-up-side reel mount 8 is disposed on the slide chassis 2, as mentioned above. A brake lever 13, which is molded with plastic material, is fitted on a shaft 14 mounted on the slide chassis 2, and is rotatable around the shaft 14. Considering hardness, etc., the brake lever 13 is preferably made of polyoxymethylene (POM). A spring 16 is hung between a spring peg part 15 provided on the slide chassis 2 and a spring peg part 13a of the brake lever 13. The brake lever 13 is urged by the spring 16 to rotate counterclockwise, as indicated by an arrow A in FIG. 1, around the shaft 14. This rotating urging force causes a brake shoe part 13b of the brake lever 13 to come into pressure contact with a tooth tip part 8a of the reel mount 8.

FIG. 3 is a side sectional view of the reel mount device of the VCR. An operating shaft part 13c of the brake lever 13 protrudes downward from the lower surface of the slide chassis 2 through a hole provided in the slide chassis 2. The operating shaft part 13c protruding from the lower surface of the slide chassis 2 is arranged to be operated by a cam part 18d of a mode lever 18 shown in FIG. 4, thereby causing the brake lever 13 to make a predetermined rotating motion, as will be described later.

FIG. 4 shows the operating mechanism part provided for operating the reel brake mechanism. A cam gear 17 is caused to operate according to an operation mode selected, by a loading motor (not shown) and a gear train (not shown) disposed on the main chassis 1. A mode lever 18 has a shaft part 18a which is fitted into a cam groove 17a provided in the cam gear 17. The mode lever 18 further has slots 18b and 18c which are fitted respectively on shafts 19 and 20 disposed on the main chassis 1. The mode lever 18 is thus arranged to be moveable in the direction of an arrow B according to the operation of the cam gear 17. The operating shaft part 13c of the brake lever 13 is operated by a cam part 18d of the mode lever 18 according to the operation of the mode lever 18, thereby driving the brake lever 13.

For example, the state shown in FIG. 4 corresponds to a state in which the tape loading is in process, i.e., being the same operating state as in FIG. 1. After that, with the mode lever 18 moved, when the operating shaft part 13c comes to a cam position 18e, the reel brake mechanism takes a position shown in FIG. 5(B). This is, for example, a reverse traveling state. In this state, the lock claw part 13d of the brake lever 13 comes into mesh with a frictional rotation gear part 8b of the reel mount 8 to lock the gear part 8b. Then, since the reel mount 8 is caused by the tape 10 to rotate counterclockwise, as indicated by an arrow in FIG. 5(B), the brake is applied by means of a friction torque caused by a friction member 8c (see FIG. 3) of the reel mount 8. This friction torque is the back tension applied to the tape 10 when the tape 10 travels in the reverse direction.

Further, with the mode lever 18 moved in the direction of the arrow B, when the operating shaft part 13c of the brake lever 13 comes to a cam position 18f of the mode lever 18, the reel brake mechanism takes another position shown in FIG. 5(A). In this position, the VCR is in a state of allowing the tape to travel in the normal direction (play direction), and the brake lever 13 is completely away from the gear part 8b of the reel mount 8. Then, the gear train (not shown) which is in connection with the capstan 4 causes the reel mount 8 to rotate clockwise, as indicated by an arrow in FIG. 5(A), thereby causing the tape 10 to be taken up in the normal direction.

As mentioned above, in order to apply a stable back tension to the tape 10 while the tape 10 is in process of loading, the brake shoe part 13b of the brake lever 13 is brought into pressure contact with the tooth tip part 8a of the gear part 8b of the reel mount 8.

The following numerically shows an example of actual arrangement of the embodiment described above. Referring to FIG. 2, the diameter φ of a circle formed by the tooth tips of the gear part 8b of the reel mount 8 is 17.2 mm. Its radius R is, therefore, 8.6 mm. On the other hand, the radius of curvature r of the brake shoe part 13b of the brake lever 13 is 11.0 mm. Further, the length L of the brake shoe part 13b is longer than one pitch P of the teeth of the gear part 8b (corresponding to two teeth) of the reel mount 8. In the case of the embodiment, as apparent from FIG. 2, the brake shoe part 13b is brought into pressure contact with three teeth of the gear part 8b at the same time. With the brake shoe part 13b made of plastic material as mentioned above, the brake shoe part 13b is capable of smoothly contacting with the tooth tip part 8a of the reel mount 8. Further, with the radius of curvature of the brake shoe part 13b arranged to be larger than the radius of the gear part 8b of the reel mount 8, the brake shoe part 13b smoothly comes into pressure contact with the tooth tip part 8a, without producing any excessive impact at the commencement of the contact.

According to the arrangement of the embodiment, as described above, in the reel mount device of the VCR in which a tape is pulled out and the tape is caused to travel in the normal and reverse directions, a reel brake lever has a brake shoe formed to have a larger curvature than the tooth tip circle of the reel mount, and a braking force on the reel mount is obtained by bringing the brake shoe into pressure contact with and moving the brake shoe away from the gear tooth tip part of the reel mount. The arrangement not only gives a stable braking force in pulling out the tape from a cassette but also permits effective utilization of a space available around the periphery of the reel mount. The arrangement does not require much space in the direction of height of the reel mount and permits reduction in number of parts. Besides, since the arrangement permits simplification of mechanism, the embodiment can be simply assembled at low cost.

What is claimed is:

1. A reel mount device comprising:
    (a) a pair of reel mounts on which to place a pair of reels, respectively;
    (b) gears respectively provided at said pair of reel mounts, each of said gears having a plurality of teeth and externally receiving a driving force for rotating the corresponding reel mount;
    (c) a first brake member having a shoe defining an arcuate surface arranged to come into contact with tips of the plurality of teeth of the gear provided at one of said pair of reel mounts; and
    (d) an urging member which urges the shoe of said first brake member in such a direction to make said shoe arcuate surface come into pressure contact with the plurality of teeth.

2. A reel mount device according to claim 1, wherein a radius of curvature of said shoe arcuate surface is larger than a radius of curvature of a circle formed by the tips of the plurality of teeth with which said shoe arcuate surface comes into contact.

3. A reel mount device according to claim 1, wherein said first brake member has a lock part which, when said first brake member has rotated against an urging force of said urging member, engages a part between two teeth of the plurality of teeth of the gear provided at said one of said pair of reel mounts.

4. A reel mount device according to claim 3, wherein said shoe and said lock part are integrally molded with said first brake member.

5. A reel mount device according to claim 1, wherein, when a tape is pulled out from said pair of reels, the shoe of said first brake member comes into pressure contact with tips of the plurality of teeth of the gear provided at said one of said pair of reel mounts.

6. A reel mount device arranged comprising:
    (a) a pair of reel mounts on which to place a pair of reels, respectively;
    (b) gears respectively provided at said pair of reel mounts, each of said gears having a plurality of teeth and externally receiving a driving force for rotating the corresponding reel mount;
    (c) a first brake member having a shoe which is arranged to come into contact with tips of the plurality of teeth of the gear provided at one of said pair of reel mounts and a lock part which is arranged to engage a part between two teeth of the plurality of teeth of the gear when the shoe moves away from the tips of the plurality of teeth; and
    (d) an urging member which urges the shoe of said first brake member in such a direction to come into pressure contact with the plurality of teeth.

7. A reel mount device according to claim 6, wherein a radius of curvature of said shoe is larger than a radius of a circle formed by the tips of the plurality of teeth with which said shoe comes into contact.

8. A reel mount device according to claim 6, wherein said shoe and said lock part are integrally molded with said first brake member.

9. A reel mount device according to claim 6, wherein, when a tape is pulled out from said pair of reels, the shoe of said first brake member comes into pressure contact with tips of the plurality of teeth of the gear provided at said one of said pair of reel mounts.

10. A recording and/or reproducing apparatus comprising:
    (a) a rotary drum having a head;
    (b) a cassette placing member capable of placing a cassette thereon and moving forward and backward with respect to said rotary drum;
    (c) a reel mount device comprising:
        a pair of reel mounts on which to place a pair of reels, respectively;
        gears respectively provided at said pair of reel mounts, each of said gears having a plurality of teeth and externally receiving a driving force for rotating the corresponding reel mount;

a first brake member having a shoe defining an arcuate surface arranged to come into contact with tips of the plurality of teeth of the gear provided at one of said pair of reel mounts; and an urging member which urges the shoe of said first brake member in such a direction to make said shoe arcuate surface come into pressure contact with the plurality of teeth; and (d) a pulling-out member arranged to pull a tape out from the cassette placed on said pair of reel mounts and to wrap the tape around said rotary drum.

11. A recording and/or a reproducing apparatus comprising:

(a) a rotary drum having a head;

(b) a cassette placing member capable of placing a cassette thereon and moving forward and backward with respect to said rotary drum;

(c) a reel mount device comprising:

a pair of reel mounts on which to place a pair of reels, respectively;

gears respectively provided at said pair of reel mounts, each of said gears having a plurality of teeth and externally receiving a driving force for rotating the corresponding reel mount;

a first brake member having a shoe which is arranged to come into contact with tips of the plurality of teeth of the gear provided at one of said pair of reel mounts and a lock part which is arranged to engage a part between two teeth of the plurality of teeth of the gear when the shoe moves away from the tips of the plurality of teeth; and an urging member which urges the shoe of said first brake member in such a direction to come into pressure contact with the plurality of teeth; and (d) a pulling-out member arranged to pull a tape out from the cassette placed on said pair of reel mounts and to wrap the tape around said rotary drum.

12. A reel mount device comprising:

(a) a pair of reel mounts on which to place a pair of reels, respectively;

(b) gears respectively provided at said pair of reel mounts, each of said gears having a plurality of teeth and externally receiving a driving force for rotating the corresponding reel mount;

(c) a first brake member having a shoe defining a surface disposable in spaced facing relation with tips of the plurality of teeth of the gear provided at one of said pair of reel mounts; and (d) an urging member which urges the shoe surface of said first brake member in such a direction to make said shoe surface to come into pressure contact with said gear provided at one of said pair of reel mounts, said shoe surface being configured such that said shoe surface contacts first ones of said plurality of teeth upon said urging of said urging member and that said shoe surface is then in spaced facing relation with others of said plurality of teeth.

* * * * *